US012732293B2

(12) United States Patent
Hoptroff

(10) Patent No.: US 12,732,293 B2
(45) **Date of Patent: *Sep. 8, 2026**

(54) SYSTEMS AND METHODS FOR WATERMARKING TIME, PLACE AND IDENTITY OF EVENTS

(71) Applicant: HOPTROFF LONDON LIMITED, London (GB)

(72) Inventor: Richard Hoptroff, London (GB)

(73) Assignee: Hoptroff London Limited, London (GB)

( * ) Notice: Subject to any disclaimer, the term of this patent is extended or adjusted under 35 U.S.C. 154(b) by 115 days.

This patent is subject to a terminal disclaimer.

(21) Appl. No.: 18/605,422

(22) Filed: Mar. 14, 2024

(65) Prior Publication Data

US 2024/0430028 A1 Dec. 26, 2024

Related U.S. Application Data

(63) Continuation of application No. 17/459,035, filed on Aug. 27, 2021, now Pat. No. 11,962,402, which is a (Continued)

(30) Foreign Application Priority Data

May 30, 2019 (GB) ..................................... 1907677

(51) Int. Cl.
*H04J 3/06* (2006.01)
*G06N 20/00* (2019.01)
(Continued)

(52) U.S. Cl.
CPC ............ *H04J 3/0655* (2013.01); *G06N 20/00* (2019.01); *H04J 3/0644* (2013.01); *H04J 3/065* (2013.01);
(Continued)

(58) Field of Classification Search
CPC ... H04B 17/318; G06F 21/1063; G06F 21/16; G06F 21/64; G06F 21/645; G06N 20/00;
(Continued)

(56) References Cited

U.S. PATENT DOCUMENTS 11,042,612 B2 * 6/2021 Li .......................... G06F 21/16
11,121,879 B2 * 9/2021 Bianzino ............... G06F 21/645
(Continued)

FOREIGN PATENT DOCUMENTS

EP 3379440 A1 9/2018
KR 20190038561 A 4/2019
(Continued)

OTHER PUBLICATIONS

EP20815008.6 Extended European Search Report dated May 8, 2023.

(Continued)

*Primary Examiner* — Frank Duong
(74) *Attorney, Agent, or Firm* — Wilson Sonsini Goodrich & Rosati

(57) ABSTRACT

The present disclosure provides systems and methods for proving an event. The system comprises a network of one or more beacon nodes and each beacon node is configured to: receive a request over the network for proving a time and location for an event, and the request comprises event data generated by a requesting entity; create a timestamp for the event using a clock of the beacon node, wherein the clock is synchronized to a trusted time source; generate a hash code for the timestamp and the event data and record the hash code to a ledger at the beacon node.

20 Claims, 6 Drawing Sheets

Related U.S. Application Data continuation of application No. PCT/US2020/034844, filed on May 28, 2020.

(51) Int. Cl.
*H04W 4/029* (2018.01)
*H04W 56/00* (2009.01)

(52) U.S. Cl.
CPC .......... *H04J 3/0667* (2013.01); *H04W 4/029* (2018.02); *H04W 56/0015* (2013.01)

(58) Field of Classification Search
CPC ........ H04J 3/0644; H04J 3/065; H04J 3/0655; H04J 3/0667; H04L 9/0866; H04L 9/321; H04L 9/3236; H04L 9/3239; H04L 9/3297; H04L 9/50; H04W 4/029; H04W 56/0015; H04W 12/61; H04W 12/63
See application file for complete search history.

(56) References Cited

U.S. PATENT DOCUMENTS 11,281,796 B2 3/2022 Pratt et al.
11,290,884 B2 3/2022 Kim
11,962,402 B2 4/2024 Hoptroff
12,245,040 B2 * 3/2025 Palyutina .............. H04L 9/3226
2016/0283920 A1 9/2016 Fisher et al.
2017/0041148 A1 * 2/2017 Pearce .................. H04L 63/126
2018/0197007 A1 7/2018 Thirion
2019/0065709 A1 2/2019 Salomon
2019/0068384 A1 2/2019 Morimoto
2019/0130416 A1 5/2019 Boudville et al.
2019/0132138 A1 5/2019 Finlow-Bates et al.
2019/0312941 A1 10/2019 Maccini et al.

FOREIGN PATENT DOCUMENTS

WO WO-2019144978 A2 8/2019
WO WO-2020243250 A1 12/2020

OTHER PUBLICATIONS

Gao, et al., A decentralized trusted timestamping based on blockchains. IEEJ Journal of Industry Applications 2017. vol. 6 No. 4 pp. 252-257, DOI: 10.154/ieejjia.6.252.

Gipp, et al., Decentralized trusted timestamping using the crypto currency bitcoin. iConference 2015, pp. 1-5.

Levesque et al., 'A Survey of Clock Synchronization Over Packet-Switched Networks', In: IEEE Communications Surveys & Tutorials, pp. 2926-2947, Jul. 12, 2016 p. 2930.

PCT/US2020/034844 International Preliminary Report on Patentability dated Nov. 16, 2021.

PCT/US2020/034844 International Search Report & Written Opinion dated Sep. 9, 2020.

Shrestha et al. Blockchain-based Message Dissemination in VANET. IEEE 3rd International Conference on Computing, Communication and Security (ICCCS), IEEE:161-166 (2018).

Stavrou et al. Verified Time. IEEE Computer Society, IEEE 50(3):78-82 (2017).

U.S. Appl. No. 17/459,035 Notice of Allowance dated Jan. 23, 2024.

U.S. Appl. No. 17/459,035 Office Action dated Oct. 12, 2023.

* cited by examiner

SYSTEMS AND METHODS FOR WATERMARKING TIME, PLACE AND IDENTITY OF EVENTS

CROSS-REFERENCE

This application is a continuation of U.S. patent application Ser. No. 17/459,035, filed Aug. 27, 2021, which is a continuation of International Patent Application No. PCT/US2020/034844 filed May 28, 2020, which claims priority to GB Application No. 1907677.7 filed on May 30, 2019, each of which is entirely incorporated herein by reference.

BACKGROUND

It has been challenging to determine the truth of an event relying on the electronic origination of information and its liberal distribution over the internet. False information can be published or propagated without checks and balances. Truth may be established by proving that a recorded event (e.g., an electronic record of an event) actually happened at a specific place and time to a specific object. For example, to prove that an event happened at a specific time and place to a specific object may require that the event content (e.g., a photo, a published work, a bank transaction, etc.) is accompanied by the time, place and identity metadata that can be demonstrated to have been determined accurately and immutably.

SUMMARY

Recognized herein is a need for methods and systems for recording events in terms of time, place and identity thereby proving when an event happened, where the event happened and to what the event happened. Methods and systems of the present disclosure may be capable of creating a watermark that is traceable and immutable in time, place and identity. Methods and systems of the present disclosure may advantageously utilize the techniques of traceable time, network (e.g., round-trip) latency and blockchain-style sequential hash codes to prove time, location and identity of an event.

In an aspect of the present disclosure, a system is provided for proving an event. The system comprises a network of one or more beacon nodes and each beacon node is configured to: receive a request over the network for proving a time and location for an event, wherein the request comprises event data generated by a requesting entity; create a timestamp for the event using a clock of the beacon node, wherein the clock is synchronized to a trusted time source; generate a hash code for the timestamp and the event data; and record the hash code to a ledger at the beacon node.

In some embodiments of the system, the trusted time source comprises a grandmaster clock receiving a GNSS or GPS time signal. In some embodiments, the clock of the beacon node is synchronized using a PTP or NTP protocol. In some embodiments, the beacon node is located at a fixed and known location.

In some embodiments, the event data includes hashed data of an event document. The timestamp is generated by the beacon node at the time of receiving the request.

In some embodiments, the beacon node is further configured to generate an estimated location of the requesting entity using a machine learning algorithm trained model. In some cases, the estimated location is generated by: (i) generating an estimated distance or location vector with respect to the requesting node based on a network latency and (ii) using the machine learning algorithm trained model to process the estimated distance or location vector to generate the estimated location. For example, the estimated distance or location vector is obtained using a route probing method. In other embodiments, the estimated distance or location vector is obtained from multiple of the beacon nodes that receive the request from the requesting entity.

In some cases, the beacon node is further configured to generate a probability that the location data is correct. For instance, the probability is generated using a machine learning algorithm trained model.

In some cases, the hash code is generating by combing previously hashed events data. In some cases, the beacon node may send the timestamp, the estimated location and the hashed event data to the requesting entity. The requesting entity may create a watermark based on the timestamp, the estimated location and the hashed event data received from the beacon node. In some cases, the requesting entity may also record a hashed value of the evet data to a hash-chain managed by the requesting entity. In other embodiments, at least one of the one or more beacon nodes is configured to audit a time, location and identity for another beacon node.

In another related yet separate aspect of the present disclosure, a method is provided for proving an event. The method may comprise: (a) receiving, at a beacon node, a request for proving a time and location for an event, and the request comprises event data generated by a requesting entity; (b) creating a timestamp for the event using a clock of the beacon node, which clock is synchronized to a trusted time source; (c) generating a hash code for the timestamp and the event data; and; (d) generating a hash code for the timestamp, the estimated location and the event data; and (e) recording the hash code to a ledger at the beacon node.

In some embodiments of the method, the trusted time source comprises a grandmaster clock receiving a GNSS or GPS time signal and the clock of the beacon node is synchronized to the time source using a PTP or NTP protocol.

In some cases, the beacon node is located at a fixed and known location. The beacon node may generate the timestamp at the time of receiving the request. The event data includes hashed data of an event document that is held by the requesting entity.

In some embodiments, the method further comprises generating, by the beacon node, an estimated location of the requesting entity using a machine learning algorithm trained model. In some cases, generating the estimated location comprises: (i) generating an estimated distance or location vector with respect to the requesting node based on a network latency and (ii) using the machine learning algorithm trained model to process the estimated distance or location vector to generate the estimated location. For example, the estimated distance or location vector is obtained using a route probing method. In another example, the estimated distance or location vector is obtained from multiple of the beacon nodes that receive the request from the requesting entity.

In some cases, the request further comprises a location data about the event. In such case, the method may further include generating a probability about the location data is correct. The probability can be generated using another machine learning algorithm trained model.

In some cases, the hash code is generated by combining previously hashed events data. In some cases, the method may further comprise sending, by the beacon node, the timestamp, the estimated location and the hashed event data to the requesting entity. In such case, the requesting entity may create a watermark based on the timestamp, the estimated location and the hashed event data. The requesting entity may also record a hashed value of the event data to a hash-chain managed by the requesting entity. In other embodiments, the beacon node may also audit another beacon node's time, location and identity.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
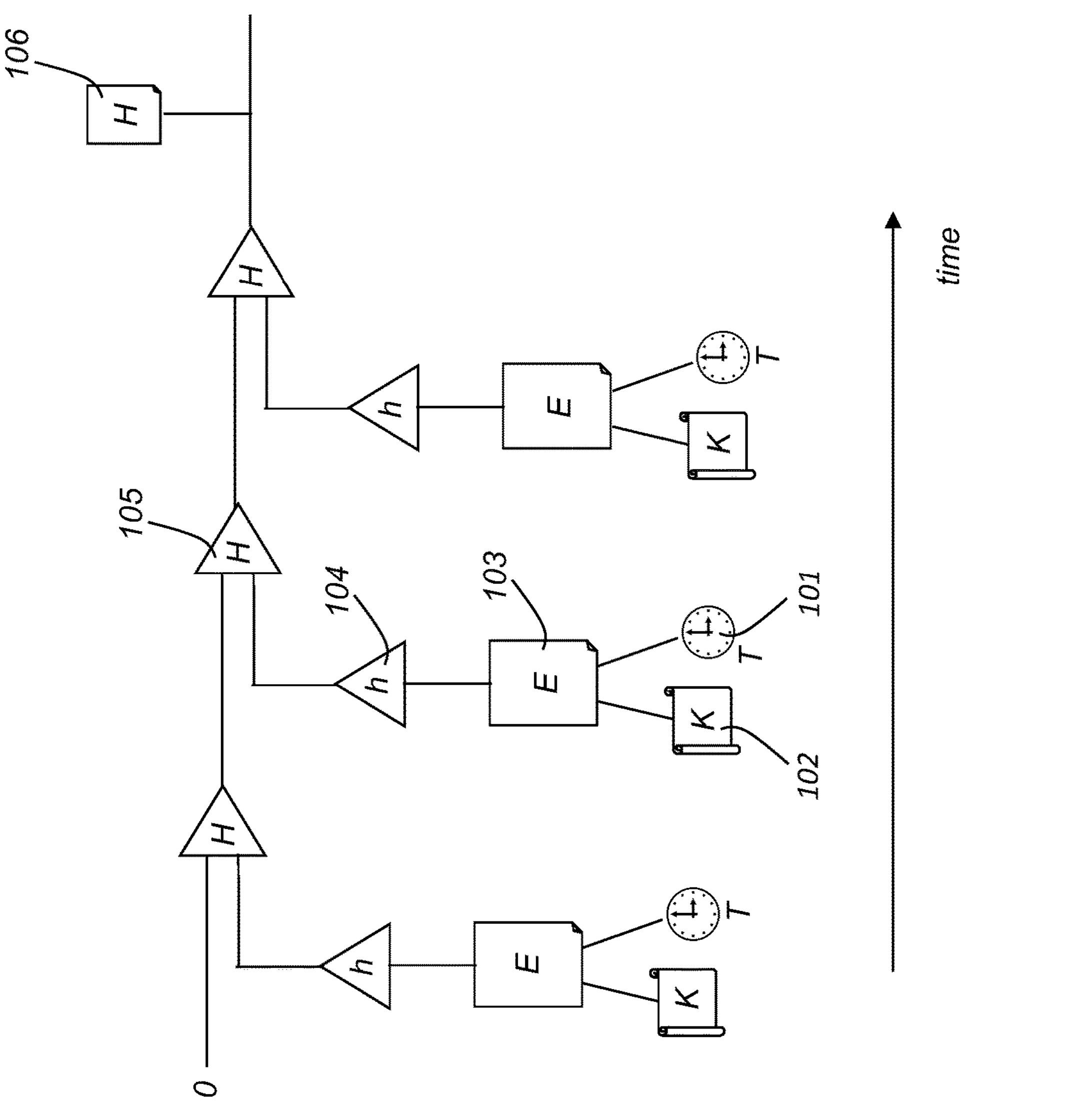
FIG. 1 schematically shows an example of a method for creating timestamp.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Certain Definitions

Unless otherwise defined, all technical terms used herein have the same meaning as commonly understood by one of ordinary skill in the art to which this invention belongs.

The term "watermark" as utilized herein may refer to digital watermarks or metadata that may be used to verify the authenticity or integrity of an event data/document or to show the identity of the event owners.

Reference throughout this specification to "some embodiments," or "an embodiment," means that a particular feature, structure, or characteristic described in connection with the embodiment is included in at least one embodiment. Thus, the appearances of the phrase "in some embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," "entity" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In some cases, a component can emulate an electronic component via a virtual machine, e.g., within a cloud computing system.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Embodiments of the invention may be used in a variety of applications. Some embodiments of the invention may be used in conjunction with various devices and systems, for example, an electronic device such as camera, automotive devices, vehicles, a personal computer (PC), a desktop computer, a mobile computer, a laptop computer, a notebook computer, a tablet computer, a server computer, a handheld computer, a handheld device, a personal digital assistant (PDA) device, a handheld PDA device, a wireless communication station, a wireless communication device, a wireless access point (AP), a modem, a network, a wireless network, a local area network (LAN), a virtual local area network (VLAN), a wireless LAN (WLAN), a metropolitan area network (MAN), a wireless MAN (WMAN), a wide area network (WAN), a wireless WAN (WWAN), a personal area network (PAN), a wireless PAN (WPAN), a virtual private network (VPN), a storage area network (SAN), a frame relay connection, an Advanced Intelligent Network (AIN) connection, a synchronous optical network (SONET) connection, devices and/or networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or long term evolution (LTE) of the above standards, units and/or devices which are part of the above networks, one way and/or two-way radio communication systems, cellular radio-telephone communication systems, a cellular telephone, a wireless telephone, a personal communication systems (PCS) device, a PDA device which incorporates a wireless communication device, a multiple input multiple output (MIMO) transceiver or device, a single input multiple output (SIMO) transceiver or device, a multiple input single output (MISO) transceiver or device, or the like.

It is noted that various embodiments can be used in conjunction with one or more types of wireless or wired communication signals and/or systems, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, multi-carrier modulation (MDM), discrete multi-tone (DMT), Bluetooth®, ZigBee™, or the like. Embodiments of the invention may be used in various other devices, systems, and/or networks.

Traditionally, time, place and identity may be established using a timestamping machine. Time stamping machine may include a clock and may have a known location. The timestamping machine may be configured to create a timestamp based on a unique object associated with an event. For example, a security guard can prove he completed his round using appropriately located timestamping machines which he uses to create a timestamp using a keyfob that he carries with him that contains a unique identity key.

FIG. 1 shows an example of a method for creating timestamp. In the illustrated example, hash codes of a non-traceable time and an identity key are linked into a chain of hash codes, where the sequence of events (flows from left to right) are recorded according to the time. In some cases, timestamp linking can be used to make the timestamp immutable (i.e., tamper-proof). As shown in FIG. 1, when an event occurs, event data may be generated including the timestamp T 101 and identity key K 102. In some cases, the event or event data may be an event document E 103. Alternatively, the event data may be the hashed event document.

In the illustrated example, the document E 103 may be hashed (e.g., hash code h 104). A hash code is an encrypted signature of the hashed data that (i) is easy to generate from the data, (ii) is sufficiently complex that it identifies the data with near-certainty, (iii) uses a many-to-one mapping to ensure that it is impossible to derive the data from the hash code, and/or (iv) is inverse-averse (e.g., one-way hash) so that it is difficult to generate alternate data that results in the same hash code. Any suitable hash algorithms can be used to create the hashed events data. The hash code may be used to ensure the privacy of the event document, and to reduce the amount of data that needs to be processed. The hash code of a single event document may not establish immutability. The hash algorithm can include, for example, cyclic redundancy checks, checksum functions, and cryptographic hash functions. In some cases, the hash algorithm can be a cyclic redundancy check such as BSD checksum, checksum, CRC-16, CRC-32, CRC-32 MPEG-2, CRC-64, or SYSV checksum. In some cases, the hash algorithm can be a checksums such as sum (Unix), sum8, sum16, sum24, sum32, fletcher-4, fletcher-8, fletcher-16, fletcher-32, Adler-32, xor8, Luhn algorithm, Verhoeff algorithm, or Damm algorithm. In some cases, the hash algorithm can be a universal hash function such as Zobrist hashing, universal one-way hash function, tabulation hashing, or Rabin fingerprint. In some cases, the hash algorithm can be a non-cryptographic hash function such as Pearson hashing, Paul Hsieh's SuperFastHash, Buzhash, Fowler-Noll-Vo hash function (FNV Hash), Jenkins hash function, Java hashCode( ), Bernstein hash djb2, PJW hash/Elf Hash, MurmurHash, SpookyHash, CityHash, numeric hash (nhash), xxHash, HighwayHash, tlha (Fast Positive Hash), orjodyhash. In some cases, the hash algorithm can be a keyed cryptographic hash function such as VMAC, UMAC, BLAKE2, Poly1305-AES, PMAC (cryptography), SipHash, One-key MAC, MD6, or HMAC. In some cases, the hash algorithm can be a unkeyed cryptographic hash function such as BLAKE-256, BLAKE-512, BLAKE2s, BLAKE2b, ECOH, FSB, GOST, Grostl, HAS-160, HAVAL, JH, MD2, MD4, MD5, MD6, RadioGatnn, RIPEMD, RIPEMD-128, RIPEMD-160, RIPEMD-320, SHA-1, SHA-224, SHA-256, SHA-384, SHA-512, SHA-3, Skein, Snefru, Spectral Hash, Streebog, SWIFFT, Tiger, or Whirlpool.

Next, the hash code may be combined by hash coding ('hash-combined') with the previous hash code to generate a hash-chain of a series of hash codes H 105 ('hash-chain ledger'). The sequence of events may be bundled into blocks and every block (except for the first block) refers back to or is linked to a prior block in the chain. The integrity (e.g., confidence that a previously recorded event has not been modified) of the entire chain of events is maintained because each block refers to or includes a cryptographic hash value of the prior block. A hash-combination may be non-commutative (e.g., J hash-combined with K gives a different result than K hash-combined with J). The sequence of events may be recorded in the order indicated by the resulting series of hash codes. By making the resulting hash code available for inspection 106 ('publishing') from time to time, the sequence of timestamps in the ledger can be difficult to dispute ('immutable').

There are a number of limitations to the conventional methods in establishing time, place and identity of an event. For example, the aforementioned method may require dedicated timestamping hardware at the place of the timestamping event, which incurs cost. This limits the scope of events or use cases to which it can be applied. Additionally, time, place and identity are not proved. For instance, the clock may be wrong such that the entire sequence or the one or more blocks of the sequence may be time-shifted. Since the timestamp cannot be trusted, linked timestamping only ensures the sequence of timestamps is immutable, establishing a relative order of events, whereas it may not be able to ensure that the timestamp itself is correct. Similarly, the timestamping machine may be moved or the location of the timestamping machine is not secured. Third, the conventional method may establish time and place at pre-ordained locations where the events take place, lacking the flexibility to adapt to timestamping impromptu events that may happen at any locations.

Methods and systems of the present disclosure may provide a watermarking system or method employ a unique proofing scheme to verify (and even guarantee) that the time, location and identity of an event are true as it claims. The present disclosure provides watermarking systems comprising a network of timestamping machines with improved accuracy and security. The provided systems and methods may employ blockchain techniques to ensure the immutability of the traceable time, location and identity of an event.

However, existing blockchain networks such as Blockchain and Ethereum may use a Proof-of-Work system (e.g., using algorithmic puzzle which is asymmetric in nature) to validate a transaction (e.g., event). These proofs can be extremely difficult to generate, but simple for a third party to verify. Security on these networks is essentially achieved by the network-wide consensus that the amount of computing power required to generate a valid proof-of-work is difficult to forge, and as subsequent blocks are added, the cumulative difficulty of the chain becomes prohibitively difficult to fabricate. These computation-heavy proofs are, however, not otherwise "useful" to the network beyond securing the blockchain. The mining process can also be extremely wasteful, as the determining factor in the work is typically computational power which consumes massive amounts of electricity and requires significant hardware to execute. Unlike the conventional blockchain networks, the provided watermarking system may including one or more timestamping machines employing a novel proofing mechanism for validating an event. Additionally, each beacon node of watermarking system registers each event in the ledger individually rather than in blocks. This may beneficially achieve parallel operations or maximize the granularity of temporal linearity.

In some embodiments the present disclosure, a timestamping machine may be a beacon node that is configured to establish a chain of events with proofed time, location and/or identity. In some cases, the provided system may comprise a network of beacon nodes that are internet-connected and use a time delivery protocol (e.g., Network Time Protocol (NTP), Precision Time Protocol (PTP)) to establish an unbroken chain of trusted time. In some cases, the network of timestamping machines may establish the proof of time using a clock servo algorithm to ensure their clocks are traceably correct and synchronized to one or more trusted time sources such as global navigational satellites systems (e.g., GPS or GLONASS), NIST or NPL (Teddington).

The one or more beacon nodes may receive timestamp/watermark requests from other nodes or components (e.g., requesting node) in the network, generate a trusted timestamp as described above and store the proofed time and event data in a hash-chained ledger. In some cases, the one or more beacon nodes may also prove the location claimed by a requesting node for an event. The beacon node may utilize network latency information for transmitting a data packet along a transmission path between the requesting node and the beacon node to derive the location/distance of the requesting node. For example, round-trip delay and/or route information along a transmission path between the requesting node and the beacon node may be used to estimate the location or a location vector of the requesting node as claimed. In some cases, the estimated location vector may be used to determine the likelihood that the location claimed by the requesting node is true. The beacon nodes may be located securely so their locations (e.g., fixed location) can be assured. In some cases, multiple beacon nodes may collectively prove the location of a requesting node for additional certainty of the location.

The requesting node may be permitted to send a timestamp/watermark request or a claim of its location using any available communication channel. In some cases, the claimed location may be used to train a predictive model for estimating a location of the requesting node by the timestamping machine. In some cases, the requesting node may record the proofed event to maintain a local hash-chain of events (e.g., since manufacture or installation) thereby proofing an identity of the requesting node.

Figure 2:
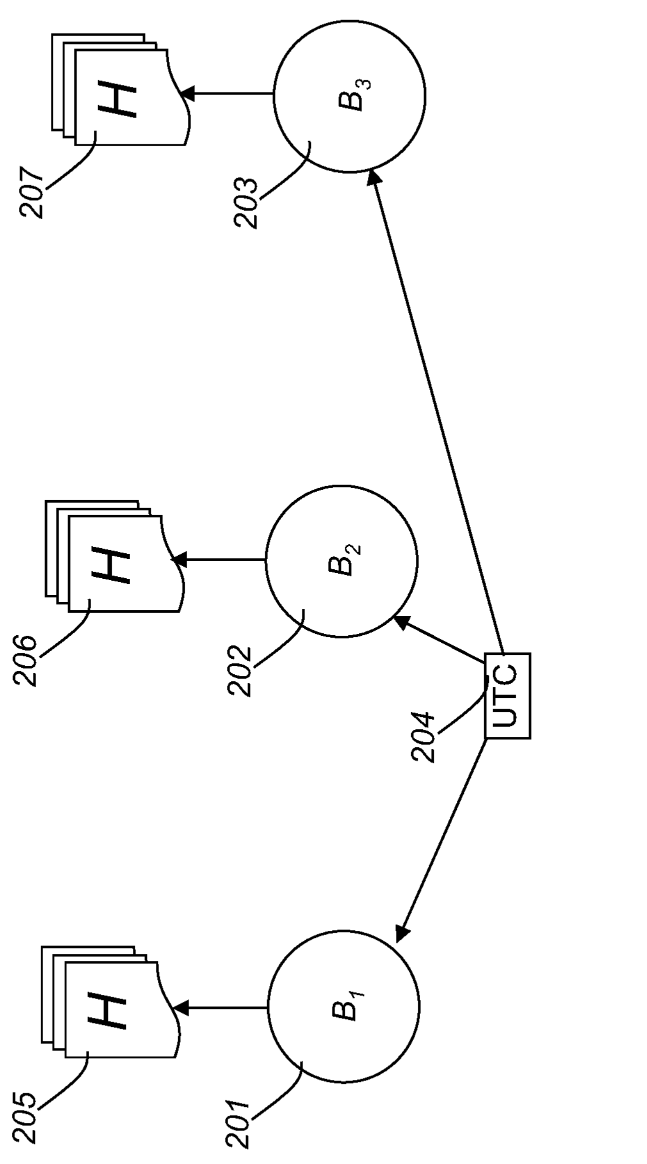
FIG. 2 schematically illustrates one or more timestamp machines with proofed and traceable time.

FIG. 2 schematically illustrates one or more timestamp machines with traceable time. The one or more timestamping machines may be beacon nodes 201, 202, 203 synchronized to a trusted time source such as Universal Coordinated Time (UTC)-traceable time 204 using a time synchronization protocol. The one or more beacon nodes may generate hash codes of time and record the hash codes into a chain of hash codes.

In some cases, the network of beacon nodes may record or add traceable timestamps into a hash-chain at regular intervals, so that the hash-chain is immutable in absolute time rather than just sequence. The beacon nodes' locations may be known and can be audited at regular intervals. In some cases, the beacon nodes may audit each other's time, place and identity traceability by sending out watermarking request (e.g., event documents E) to the other beacon nodes. The beacon nodes may prove the time, location and identity of another beacon node using the methods as described elsewhere herein.

The network of timestamping machines/beacon nodes may form a secured and distributed ledger of events which is immutable in time, place and identity. In some cases, the ledger information may be provided to the requesting entity (e.g., requesting node/device) allowing the requesting entity to create a watermark for the event document.

As illustrated in FIG. 2, a network of beacon nodes $B_1$ (201), $B_2$ (202), $B_3$ (203), . . . $B_i$ . . . $B_N$ are distributed across known and secure locations. The beacon nodes $B_1$ (201), $B_2$ (202), $B_3$ (203), . . . $B_i$ . . . $B_N$ may be a server or any suitable apparatus capable of timestamping an event, data packet and the like. The one or more beacon nodes may be located at tamper-free and known locations. In some cases, the one or more beacon nodes may have fixed or pre-known locations. In some cases, the plurality of beacon nodes may communicate with each other over a communication network (e.g., Ethernet).

The beacon nodes $B_1$ (201), $B_2$ (202), $B_3$ (203), . . . $B_i$ . . . $B_N$ may each comprise a clock synchronized to a grandmaster clock (i.e., clock receiving time signals from global navigational satellites systems ("GNSS") such as GPS or GLONASS) or trusted time source such as NIST or NPL. For instance, the beacon nodes may receive a UTC traceable time 204 over a network (e.g., Ethernet) using standard protocols. The standard protocols may be timing and synchronization standards such as Network Time Protocol ("NTP") and Precision Time Protocol ("PTP"). The PTP and NTP protocols are packet-based methods that transfer time and frequency references using packets containing time stamps that identify the times of departure/arrival of packets. PTP and NTP can distribute timing and frequency alignment throughout the network in a point-to-point fashion. The clocks in a network are typically organized into a master-slaves hierarchy, and clock synchronization messages are communicated among nodes to synchronize all slave clocks (e.g., beacon nodes clock) with a master clock. The delay spent in carrying a master clocks time stamp to a slave clock may then affect the accuracy of clock synchronization. The PTP and NTP may compensate for the delay incurred by transmission over the Ethernet by sending a timed message in both directions, allowing a round-trip delay to be measured.

The one or more beacon nodes $B_1$ (201), $B_2$ (202), $B_3$ (203), . . . $B_i$ . . . $B_N$ may be configured to log event data using sequential hash codes in their ledgers (205, 206, 207). The hash function or hash algorithm for generating the hash codes can be the same as those described in FIG. 1. For example, a hash code may be a cryptographic hash value of an event data (i.e., document E).

Figure 3:
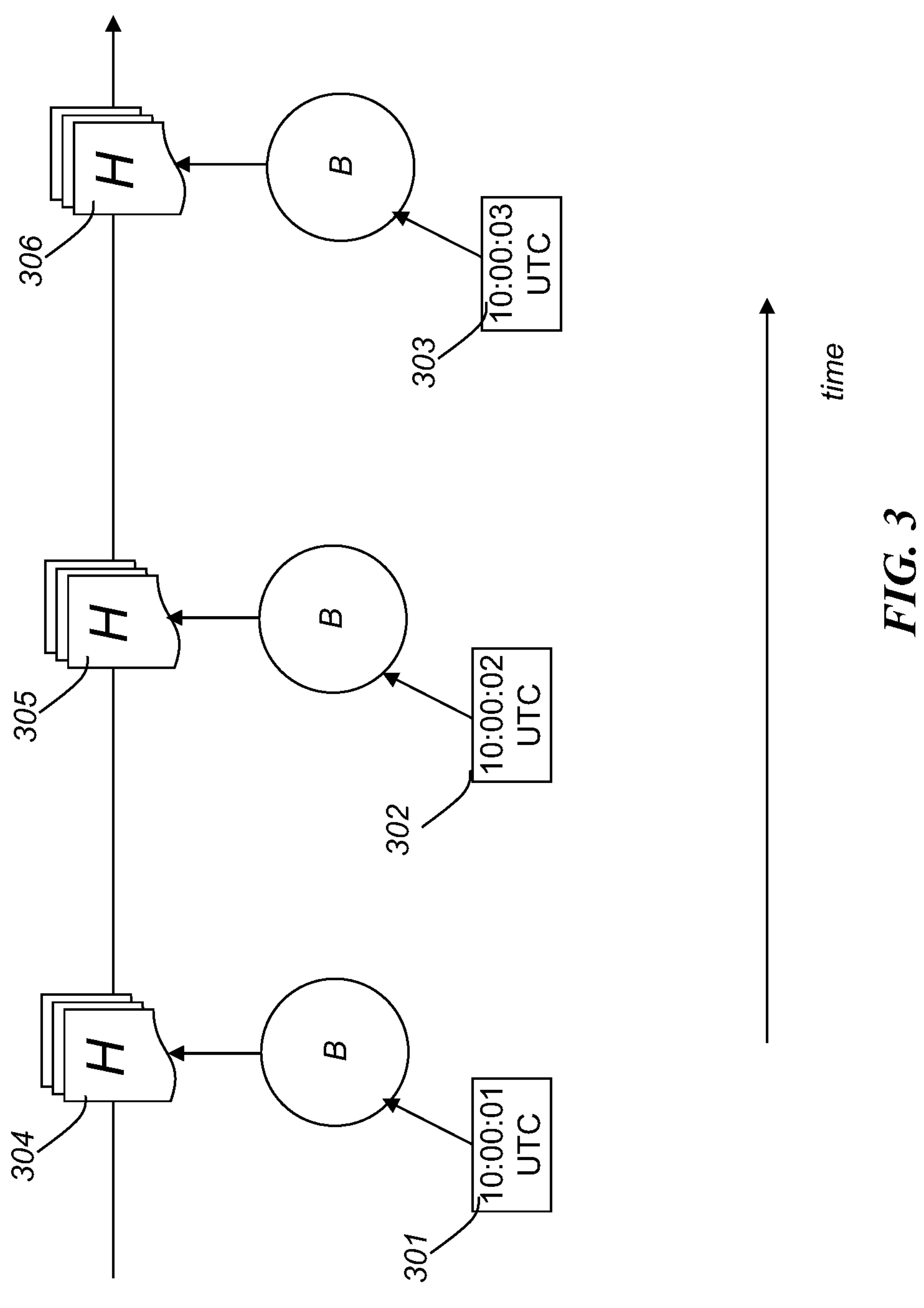
FIG. 3 schematically illustrates a network of beacon nodes synchronized to a trusted time source and configured to generate a chain of hash codes for a sequence of time events.

FIG. 3 schematically illustrates a network of beacon nodes synchronized to a time source (e.g., UTC-traceable time) and configured to generate a chain of hash codes for a sequence of time events. The one or more beacon nodes may generate hash codes of time on a regular basis and enter the hash codes into a chain of hash codes as shown in FIG. 3. For example, a hash code may be combined by hash coding ('hash-combined') with the previous hash code to provide a sequential series of hash codes H ('hash-chain ledger'). In some cases, the hash codes may be entered at regular intervals or at fixed epoch (e.g. once per second) such as time (301, 302, 303), and each beacon node B hash-combines the current UTC traceable time into its ledger (304, 305, 306). As an example, a block at a given epoch may comprise a cryptographic timestamp, previous block hash, signatures, and the like. In some cases, a block may include a summary of a series of of events in the block. The hash-chain ledger may utilize any suitable structure to record the sequence of events such as a Merkle tree. The Merkle tree may be a hash tree. The Merkle tree can be a binary hash tree. The Merkle tree is a data structure that can be used for efficient and secure verification of the contents of large data structures.

In some cases, the one or more timestamping machines may receive event data from one or more requesting nodes over a network. The event data may be hashed data of an event document or event content. In some cases, a requesting entity (e.g., a device) may generate an event document E that requires a watermark W to demonstrate its time and place. In some cases, the event document may also require a watermark to demonstrate an identity of the requesting node or the owner of the event (e.g., digital camera). The event data/document may include the event content (e.g., a photo, a published work, a bank transaction, etc.).

Figure 4:
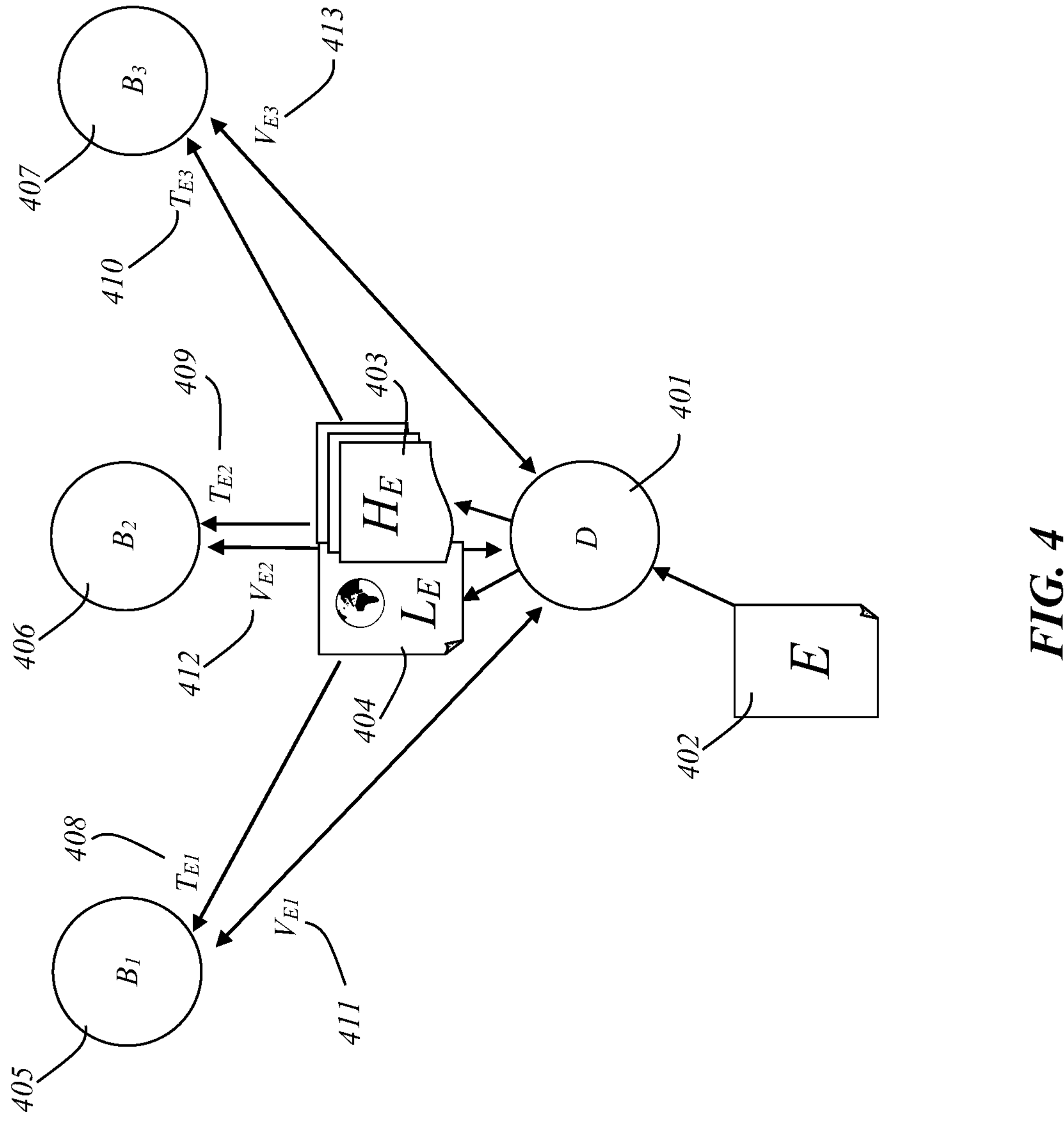
FIG. 4 shows an example of a requesting node (e.g., device D) in communication with one or more beacon nodes.

FIG. 4 shows a requesting node (e.g., device D) sending a timestamping or watermarking request along with event data to one or more beacon nodes $B_1$, $B_2$, $B_3$ (405, 406, 407). As described above, the event data may be hash codes of an event document. A device D (401) may request one or more beacon nodes to watermark one or more event documents E (402) in time and place by creating a hash $H_E$ (403) of the event document E (402) and sending the hashed event data $H_E$ to the beacon nodes. In some cases, the location information $L_E$ (404) may be available/accessible to the requesting. In such case, the requesting node (e.g., device 401) may also send the location information $L_E$ (404) to the one or more beacon nodes. For instance, the device D may be capable of obtaining location data utilizing suitable location-based technologies such as Global Navigation Satellite System (GNSS), cellular triangulation, assisted-GPS (A-GPS), differential global positioning system (DGPS), and the like.

Although only one requesting node is illustrated in the figure, it should be noted that the one or more beacon nodes may receive timestamping or watermarking request or events data from more than one requesting nodes. In some cases, the one or more beacon nodes may receive a sequence of events or timestamping requests from the same requesting node. In some instances, the sequence of events may share the same location (e.g., requesting entity has a fixed location) but occur at different time points. The one or more beacon nodes may each timestamp a respective event data and prove the location of the event using the provided methods. In some cases, since the true location of the requesting node is the same, the multiple estimated location vectors generated by the one or more beacon nodes may be combined and collectively analyzed to estimate a location of the requesting node thereby improving the location accuracy. Such scenarios are described with respect to FIG. 6.

Alternatively, the requesting node may be mobile or moving such that the sequence of events may have different locations. Beneficially, because the provided time, location and identity proofing mechanism validates the events without having to provide an associated complex block-proof, beyond a threshold signature, there is essentially no settlement time, and the event watermarking throughput can be extremely high compared to other blockchains, such as a Nakamoto Consensus blockchain (e.g., Bitcoin, Ehtereum).

In some cases, the requesting node (401) may be configured to generate a hash code $H_E$ of an event document E (402), and enter the hash code into a local chain of hash codes maintained by the requesting node (401). In some cases, the hash code may be generated by hashing on the event document, an identity (e.g., identity of the owner or requesting entity), the watermark, the received logged data such as timestamp, estimated distance or any combination of the above. The hash code may be recorded to a ledger managed by the requesting entity. By maintaining a hash-chain that logs the sequence of events that have happened to the requesting entity, the device's or requesting entity's identity may be proofed and immutable. In some cases, the requesting entity may also distribute the local hash-chain to the one or more beacon nodes for establishing the identity.

Upon receiving the hashed event data $H_E$ and the optional location information $L_E$, each beacon node Bi (405, 406, 407) may timestamp the UTC traceable time $T_{Ei}$ (408, 409, 410) at receipt of the request or hashed event data, and calculate a location vector $V_{Ei}$ (411, 412, 413) for proving the location of the event.

The one or more beacons may prove the location of the requesting node using any suitable method. For example, the one or more beacons may estimate the location or distance of the requesting entity using network delay. The one or more beacons may utilize round-trip delay and/or route probing process to estimate the location or a location vector of the requesting node. For instance, by sending a data packet using a route-probing process, such as a round-trip ping delay, tracepath, MTR (combination of traceroute and probing), or a traceroute series of latencies and IP addresses, each ping or traceroute probe is timestamped on transmission and return, the transmission distance can be estimated.

Other methods such as triangulation (e.g., a beacon triangulation method to determine the coordinate of requesting node's position referencing to three or more beacons in proximity), or a combination of time of arrival and RF signal strength may be utilized to estimate the location vector (e.g., based on the inverse-square law, distance between two nodes is obtained based on maximum RSSI (Received Signal Strength Indication) p possible for a packet transmitted as $\mu=1/D^2$). In some cases, the estimated distance or location vector may be used to determine the likelihood that the location claimed by the requesting node is true.

In some embodiments of the present disclosure, the one or more beacon nodes may prove the location employing a machine learning algorithm trained model. The model may be capable of predicting a location of the requesting node based on the estimated location or location vector generated by the beacon node. In some case, an input feature of the model may be generated based on the estimated location or location vector provided by the beacon node and the output may include a predicted location.

Alternatively or additionally, the output data may include a probability of a location of the event such as a confidence level of proving a location claimed by the requesting node is correct or the likelihood that the claimed location is true. In some instances, when the confidence level or likelihood is beyond a pre-determined threshold (e.g., 80%), the claimed location or predicted location may be logged into the beacon node's hash-coded ledger. In some instances, when the confidence level or likelihood is below a pre-determined threshold (e.g., 60%), it may indicate an anomalous location. The event may not be recorded to the chain of events and/or further validation/verification of the event may be required. Alternatively, the event may still be recorded with the estimated location or distance generated by the beacon nodes.

Artificial intelligence, such as machine learning algorithms, may be used to train the predictive model. A machine learning algorithm may be a neural network, for example. Examples of neural networks include a deep neural network, convolutional neural network (CNN), and recurrent neural network (RNN). In some cases, a machine learning algorithm trained model may be pre-trained and implemented on the system, and the pre-trained model may undergo continual re-training that involves continual tuning of the predictive model or a component of the predictive model (e.g., classifier) to adapt to changes in the implementation environment over time (e.g., changes in the device/event data, available labeled data, model performance, etc.).

The term "labeled data" or "labeled dataset," as used herein, generally refers to a paired dataset used for training a model using supervised learning. In some cases, the location data $L_E$ provided by the requesting node (e.g., device 401) may be used as the labeled data that is paired with the corresponding estimated location vector/location to form a training dataset.

For example, the location data $L_E$ is provided by the device D 401 and the beacon node B may generate estimated location vector $V_{Ei}$. The location $L_E$ (i.e., ground-truth data) may be paired with the estimated location vector to form a training dataset to train a model. The model may be trained to predict a location $D_{Ei}$ of the requesting device D, based on $V_{Ei}$.

In some cases, a second model may be trained to estimate a probability $P_{Ei}$ that the claimed $L_E$ is correct. For instance, the input data to the second model may include the predicted location generated by the first model and a location claimed by the requesting node. Alternatively, the probability may be calculated using any suitable mathematical methods based on the difference/deviation between the predicted location $D_{Ei}$ generated by the first model and the claimed location $L_E$. The difference or deviation may be transformed into the probability $P_{Ei}$ that the claimed $L_E$ is correct.

Figure 5:
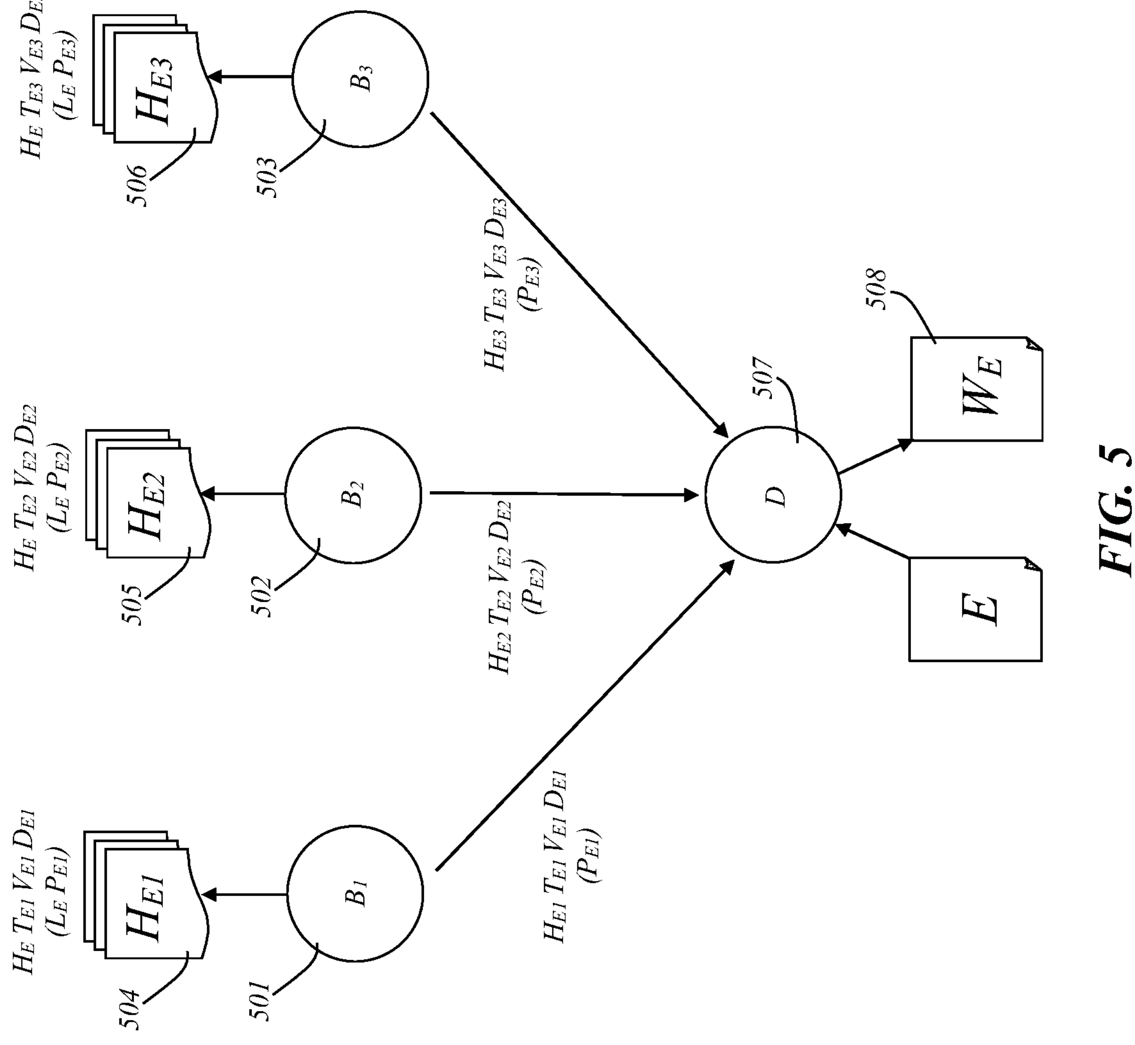
FIG. 5 schematically illustrates a watermarking system comprising one or more beacon nodes.

Upon proving the location of the event and establishing the time, the one or more beacon nodes may log the event data and watermark to the respective ledgers. The one or more beacon nodes may create blockchain-style sequential hash codes to provide a watermark that is traceable and immutable in time, place and identity. FIG. 5 schematically illustrates a watermarking system comprising one or more beacon nodes logging the hash code of the event content $H_E$, timestamp $T_{Ei}$, estimated location vector $V_{Ei}$, proofed location or distance $D_{Ei}$, optional location $L_E$ claimed by the requesting node and the probability about the truth of claimed location $P_{Ei}$. A block of the hash-chain of watermarked events may include a sequence of previous hashed events data recorded in any suitable structure such as a Merkle tree as described above.

In some cases, the beacon node may return or send the logged data to the requesting device. The requesting device may create a watermark for the event. For example, the beacon node $B_i$ (501, 502, 503) may log the hashed event data, timestamp, estimated location vector, distance $H_E$, $T_{Ei}$, $V_{Ei}$, $D_{Ei}$ and optionally the claimed location, probability $L_E$, $P_{Ei}$ to its ledger, and create the hash code $H_{Ei}$ (504, 505, 506). Next, the beacon node $B_i$ (501, 502, 503) may send the logged data $T_{Ei}$, $V_{Ei}$, $D_{Ei}$, $H_{Ei}$ and optionally the probability $P_{Ei}$ to the requesting device D (507). The device D (507) may record the timestamp $T_{Ei}$, estimated location vector $V_{Ei}$, proofed location or distance $D_{Ei}$, and the hash code of the event $H_{Ei}$ received from all of the beacon nodes as a watermark WE (508) for the event document E that occurred at the requesting device D. In some cases, the watermark WE may be stored as metadata of the event document. In some cases, the watermark may be a data structure containing the timestamp $T_{Ei}$, proofed distance $D_{Ei}$, and the hash code of the event content $H_{Ei}$. In some cases, the watermark may optionally include the location data $L_{Ei}$ or an identity of the requesting node.

In some embodiments, the watermarking system may comprise a central beacon node. The central beacon node may be in communication with one or more beacon nodes over a network as described above to provide the proofed location (or distance to the requesting node) of an event.

Figure 6:
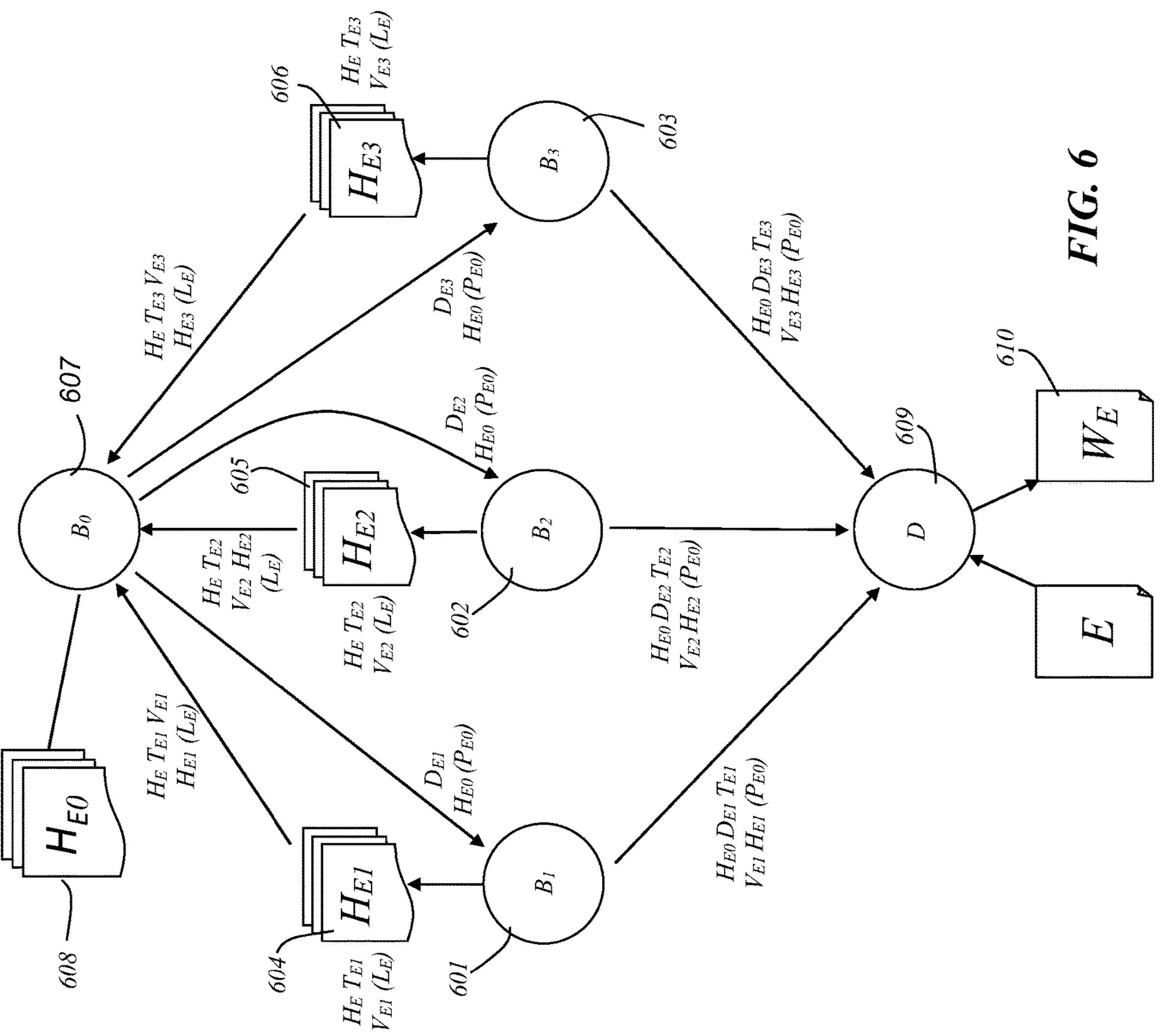
FIG. 6 shows an example of a watermarking system comprising a central/master beacon node $B_0$.

FIG. 6 shows an example of a watermarking system comprising a central/master beacon node $B_0$. The central beacon node $B_0$ (607) may receive the logged data such as hashed event data $H_E$, timestamp $T_{Ei}$, and estimated location vector $V_{Ei}$, from the plurality of beacon nodes to generate an estimate of the location of the requesting device D (609) with improved accuracy. In the illustrated exemplary system, the proofed location or distance may be provided by the central/master beacon node. The plurality of beacon nodes may each generate an estimate of the location of the requesting device D using the method as described above.

In the illustrated example, the beacon node $B_i$ (601, 602, 603) logs the hashed event data $H_E$, timestamp $T_{Ei}$, estimated location vector $V_{Ei}$, (and optional location information $L_E$) to the respective ledger, and creates hash code $H_{Ei}$ (604, 605, 606). The beacon node $B_i$ (601, 602, 603) may send $H_E$, $T_{Ei}$, $V_{Ei}$, $H_{Ei}$ (and optional $L_E$) to the master beacon $B_0$ (607). The master beacon node $B_0$ (607) may collect the values $H_E$, $T_{Ei}$, $V_{Ei}$, $H_{Ei}$ (and optional $L_{Ei}$) from the one or more beacon nodes (601, 602, 603) and generate an estimated location or distance DE of the requesting node based on the one or more estimated location vectors $V_{Ei}$. In some cases, the master beacon node may generate a probability of a location of the event such as a confidence level of proving the location claimed by the requesting node is correct or the likelihood of the claimed location is true. The methods of generating the proofed location or distance can be the same as the those as described above. For example, a machine learning algorithm trained model may be used to generate a location of the event or a likelihood of the claimed location is correct.

As an example, when the location information $L_E$ is provided by the requesting node D, the collective location vectors $V_{Ei}$ and the location information $L_E$ may be used as training datasets to train a model that estimates position DE of the requesting node D, based on $V_{Ei}$. When the model is deployed for inference by the master beacon $B_0$ (607), the inputs may be generated based on the estimated location vectors $V_{Ei}$ received from the multiple beacon nodes and the output may be the location $D_{E0}$.

In some cases, when the location information $L_E$ is provided by the requesting node D, the master beacon $B_0$ (607) may generate the probability $P_{E0}$ that the location $L_E$ is correct based on the collective location vectors $V_{Ei}$ using a trained predictive model. The type of predictive model or training process can be the same as those as described elsewhere herein. By leveraging the estimated location data across multiple beacon nodes, the overall accuracy of the predicted location may be improved.

In some cases, the master beacon node $B_0$ (607) may make inference about the position $D_{Ei}$ of the requesting node relative to each beacon node $B_i$ (601, 602, 603) based on the collective location vectors $V_{Ei}$ using a trained predictive model.

The master beacon node $B_0$ (607) may log the proved location or distance $D_{E0}$, the collected timestamps $T_{Ei}$, location vectors $V_{Ei}$, the hashed event data $H_{Ei}$, predicted respective locations $D_{Ei}$, and optional $L_E$, $P_{E0}$ to its ledger $H_E$. The master beacon node $B_0$ (607) may also create a hash code $H_{E0}$ (608) of the event data. The master beacon node $B_0$ (607) may send the respective locations $D_{Ei}$ along with the hashed event data $H_{E0}$ (and optional $P_{E0}$) back to the respective beacon nodes $B_i$ (601, 602, 603).

The multiple beacon nodes $B_i$ (601, 602, 603) may send the respective predicted locations $D_{Ei}$ and $H_{E0}$ (and optional $P_{E0}$) along with the respective logged data $T_{Ei}$, $V_{Ei}$, $H_{Ei}$, to the requesting node or as device D (609). The device D (609) may generate a watermark WE (610) for the event E that occurred at device D based on the hashed event data $H_{E0}$ (and optional probability value $P_{E0}$) and the set of the logged data $T_{Ei}$, $V_{Ei}$, $D_{Ei}$, $H_{Ei}$.

The hash codes generated by the beacon nodes or master beacon node such as $H_{E0}$ and $H_{Ei}$ may be regularly published to engrain immutability. In some cases, the watermark WE may be distributed with the event document E, and the watermark may also be hashed $H_E$ (403) on the ledger of the requesting node (e.g., device) and published.

The one or more nodes (e.g., requesting nodes) of the network can be various types of devices. For example, the requesting node may include digital cameras, automotive devices, computing devices, wearable devices and the like that require time service. The computing devices may include, for example, personal computers, tablet computers, smart phones, set top boxes, desktop computers, laptops, gaming systems, servers, data centers, and various other devices or systems. A plurality of other devices or components can establish a connection through the network. A node may be any device equipped with communication capabilities. The communications may be wired or wireless communications. The node may be operating over various technologies such as Worldwide Interoperability for Microwave Access (WiMAX) and infrastructure IEEE 802.11 variants, such as IEEE 802.11a/b/g/n/ac, Global System for Mobile communication (GSM), Universal Mobile Telecommunications System (UMTS), High Speed Downlink Packet Access (HSDPA), Code Division Multiple Access (CDMA), Long Term Evolution (LTE), and various others as described elsewhere herein. In some cases, a node may be a Bluetooth or Wi-Fi enabled device, such as laptops, cellular phones, Personal Digital Assistant (PDA), Smartphone, HSDPA terminal, CSMA terminal and various other access terminals.

Various methods or components (e.g., beacon node, requesting node) of the present disclosure may be implemented by software, hardware or a combination of both. The provided system can have one or more processors and at least one memory for storing program instructions. The processors may be located at the time receiver or time source. The processors may be part of the receiver or source. Alternatively, the processors may be located remote to the receiver or source. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the algorithms for calculating the estimated error in accuracy or performing time distribution testing can be implemented in hardware components (e.g., ASICs, special purpose computers, or general purpose computers), software or combinations of hardware and software While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A computer-implemented method for proving an event comprising:

(a) receiving, at a beacon node, a request for proving a time and location for an event, wherein the request comprises event data generated by a requesting entity;

(b) creating a timestamp for the event using a clock of the beacon node, wherein the clock is synchronized to a trusted time source to establish a proof of the time for the event;

(c) generating an estimated location of the requesting entity to establish a proof of location for the event;

(d) generating a hash code for the timestamp and the event data; and (e) recording the hash code to a ledger at the beacon node.

2. The computer-implemented method of claim 1, wherein the request further comprises a location data about the event.

3. The computer-implemented method of claim 2, wherein the proof of the location for the event is established by determining a probability that the location data is correct based on the estimated location.

4. The computer-implemented method of claim 3, wherein the probability is generated using a machine learning algorithm trained model.

5. The computer-implemented method of claim 1, wherein the proof of location for the event is based on multiple estimated locations generated by multiple beacon nodes.

6. The computer-implemented method of claim 1, wherein the estimated location is an estimated distance or location vector that is obtained using a route probing method or based on the Received Signal Strength Indication (RSSI).

7. The computer-implemented method of claim 6, wherein the estimated distance or location vector is obtained from multiple of the beacon nodes that receive the request from the requesting entity.

8. The computer-implemented method of claim 2, wherein the trusted time source comprises a grandmaster clock receiving a GNSS or GPS time signal.

9. The computer-implemented method of claim 2, wherein the clock is synchronized using a PTP or NTP protocol.

10. The computer-implemented method of claim 2, wherein the event data comprises hashed data of an event document.

11. The computer-implemented method of claim 2, wherein the timestamp is generated at the time of receiving the request.

12. The computer-implemented method of claim 1, wherein the hash code is generating by combing previously hashed events data.

13. The computer-implemented method of claim 2, further comprising creating, by the requesting entity, a watermark based on the timestamp, the estimated location and the hashed event data sent from the beacon node.

14. The computer-implemented method of claim 1, wherein the requesting entity is configured to record a hashed value of the event data to a hash-chain managed by the requesting entity.

15. A system for proving an event comprising:

a network of beacon nodes, wherein at least one of the beacon nodes is configured to:

a) receive, at a beacon node, a request for proving a time and location for an event, wherein the request comprises event data generated by a requesting entity;

b) create a timestamp for the event using a clock of the beacon node, wherein the clock is synchronized to a trusted time source to establish a proof of the time for the event;

c) generate an estimated location of the requesting entity to establish a proof of location for the event;

d) generate a hash code for the timestamp and the event data; and e) record the hash code to a ledger at the beacon node.

16. The system of claim 15, wherein the event data includes hashed data of an event document.

17. The system of claim 15, wherein the request further comprises a location data about the event.

18. The system of claim 17, wherein the proof of the location for the event is established by determining a probability that the location data is correct based on the estimated location.

19. The system of claim 15, wherein the proof of location for the event is based on multiple estimated locations generated by the network of beacon nodes.

20. The system of claim 15, wherein the estimated location is an estimated distance or location vector that is obtained using a route probing method or based on the Received Signal Strength Indication (RSSI).

* * * * *